Dec. 1, 1959    R. H. BISHOP    2,915,213
PALLET FOR CARRYING BREAD OR THE LIKE
Filed June 1, 1953
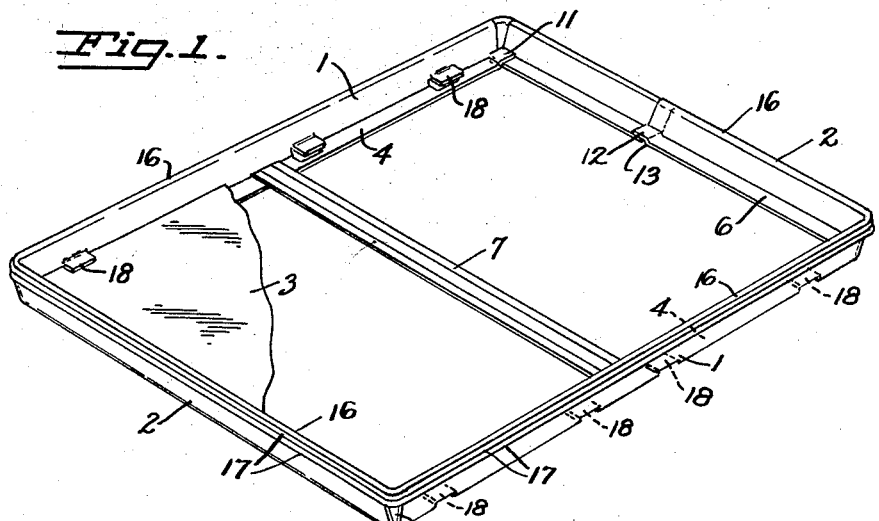
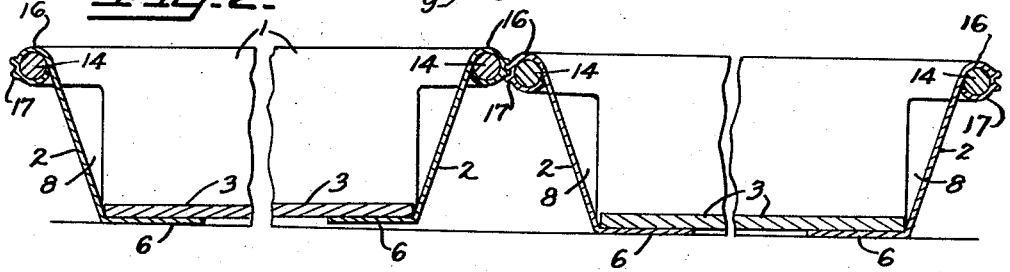
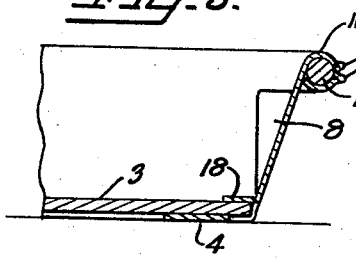
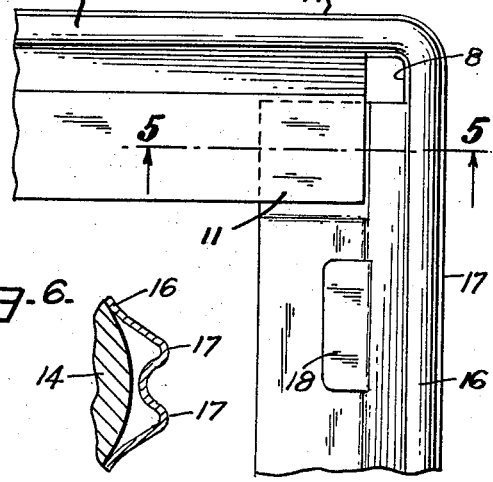
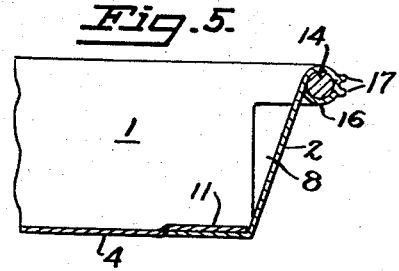
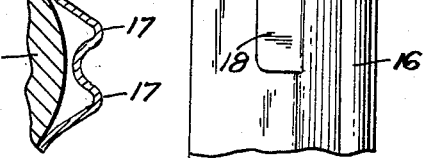
INVENTOR.
RAY H. BISHOP
BY George B. White
ATTORNEY

United States Patent Office 2,915,213
Patented Dec. 1, 1959

2,915,213

PALLET FOR CARRYING BREAD OR THE LIKE

Ray H. Bishop, San Francisco, Calif., assignor to Del-Tra Company, a corporation of California Application June 1, 1953, Serial No. 358,783

1 Claim. (Cl. 220—23.4)

This invention relates to a nesting pallet.

In the so-called pallet system of transporting bread or the like from the wrapper in a bakery to trucks, or for transporting any article in trucks or the like, previously there existed several serious disadvantages, namely: the pallets placed in series on the usual rails on a truck slid or climbed upon one another whenever the truck came to a sudden stop or at a sudden start, or on steep inclines; furthermore, there was difficulty in nesting the pallet on other baskets or trays; and difficulty in keeping pallets clean and undented.

The primary object of the invention is to overcome the above and other difficulties in pallet systems of transportation, and to provide a pallet which has a rim or periphery for interengagement between adjacent pallets so as to prevent the climbing or sliding of a pallet upon the next, and which has a reinforced rim structure to prevent buckling or bending and facilitate nesting, and which has facile arrangement for quick detachable engagement and positive holding of liner forming the bottom of the pallet; and which has its overlapping edges so recessed as to form a continuous bottom surface without protuberances and thereby insure smooth sliding for removal or replacement on tracks, and which is an integral unitary frame strong but light and permits easy handling.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Figure 1 is a perspective view of a pallet constructed in accordance with my invention.

Figure 2 is a sectional view of a pair of inter-engaged pallets.

Figure 3 is a fragmental sectional view of a pallet.

Figure 4 is a fragmental plan view of a corner of a pallet.

Figure 5 is a fragmental sectional view, the section being taken on the lines 5—5 of Figure 4.

Figure 6 is a fragmental sectional view of the rim.

In the herein illustrative embodiment of the invention, the pallet includes sides 1 and ends 2 formed into a generally oblong rectangular frame, and a bottom liner 3 resting on side flanges 4 and end flanges 6, and on a central flat cross brace 7.

The sides 1 and the ends 2 are made of a single piece of sheet metal strip, with substantially V-shaped cut-outs 8 at each corner so as to permit the forming into said oblong rectangular skeleton frame. The apex 9 of each cut-out 8 is at the lower edge of each corner. This cut-out is formed by cutting out a perpendicular strip from the blank sides and ends before bending, so that after the rectangular frame is formed and the respective flanges are bent inwardly, the flanges 4 and 6 overlap at the bottom of each corner. At each overlapping portion the top flange is recessed or offset upwardly to accommodate the overlapping lower flange at an even bottom level. For instance in Figure 1 in the visible upper corner the end of the side flange 4 is recessed upwardly at 11 to nest the overlapping end of the end flange 6.

The free ends 12 of the continuous strip also overlap and are recessed at 13 for a smooth union at the middle of the end 2 shown at the top of Figure 1. The sides and ends 2 are inclined upwardly and outwardly.

All said overlapping portions are integrally united, for instance, by welding, so as to form a solid unitary frame.

The rim around the top edges of the sides 1 and ends 2 is formed by a single reinforcing rod or wire 14 formed into the oblong rectangular shape corresponding to the top edges of said frame. The top edge of the strip forming said sides 1 and ends 2 is turned outwardly from the frame and over and around said rod or wire 14 so as to surround said rod or wire 14. The turned over portion or edge sleeve 16 of the strip has formed thereon all around a pair of spaced parallel longitudinal ridges 17 protruding outwardly. As the pallets are placed in series, end to end or side by side, the ridges 17 of the rims of the adjacent pallets interlock and prevent relative upward shifting of the adjacent pallets, hence prevent the accidental climbing or piling of one pallet upon the next.

It is preferable that the ridges 17 be formed on the blank before the edges of the blank are rolled over the rod or wire 14. Thus the ridges 17 are hollow, yet add to the rigidity of the frame.

The bottom liner 3 is a replaceable sheet of fiberboard or the like. This liner 3 is held on the flanges 4 and 6 by tongues 18 struck out of the respective sides 1 so as to extend spaced above and parallel with the respective side flanges 4. There are three such holding tongues 18 along each side flange 4. The liner 3 is inserted beneath the tongues 18 and is held in place thereby.

I claim:

Rim construction for trays, each tray having sides and ends, comprising a stiffening element extended around said rim, a retaining rim sleeve extending along said sides and ends and surrounding said stiffening element, and ridges projecting outwardly from the outer side circumference of said sleeve in registry with said stiffening element being circumferentially longitudinal with respect to said sleeve and being interengageable with ridges of adjacent trays to resist relative movement of said trays.

References Cited in the file of this patent

UNITED STATES PATENTS

| | | |
|---|---|---|
| 298,418 | Shaw | May 13, 1884 |
| 1,041,347 | Potter | Oct. 15, 1912 |
| 1,207,279 | Crum | Dec. 5, 1916 |
| 1,212,864 | Will | Jan. 16, 1917 |
| 1,217,291 | Farrington | Feb. 27, 1917 |
| 1,669,057 | Katzinger | May 8, 1928 |
| 1,826,080 | Lockwood | Oct. 6, 1931 |
| 2,015,744 | Davis | Oct. 1, 1935 |
| 2,059,664 | Tashjion | Nov. 3, 1936 |
| 2,090,728 | Heide | Aug. 24, 1937 |
| 2,241,781 | Jackson | May 13, 1941 |
| 2,309,535 | Rathbun | Jan. 26, 1943 |
| 2,347,694 | Langel | May 2, 1944 |
| 2,410,922 | Balduf | Nov. 12, 1946 |
| 2,544,232 | Kennedy | Mar. 6, 1951 |
| 2,565,823 | Pool | Aug. 28, 1951 |
| 2,688,420 | Bishop et al. | Sept. 7, 1954 |

FOREIGN PATENTS

| | | |
|---|---|---|
| 13,869 | Great Britain | July 18, 1894 |